United States Patent [19]

Phillips et al.

[11] Patent Number: 5,021,125

[45] Date of Patent: Jun. 4, 1991

[54] PISTONLESS ACCUMULATOR

[75] Inventors: Joseph R. Phillips; John D. Weston, both of Glens Falls, N.Y.; Michael D. Meredith, Beaverton, Oreg.

[73] Assignee: Kamyr, Inc., Glens Falls, N.Y.

[21] Appl. No.: 400,737

[22] Filed: Aug. 30, 1989

[51] Int. Cl.⁵ ........................ F16L 55/04

[52] U.S. Cl. ........................ 162/232; 138/30; 137/207

[58] Field of Search ........................ 137/207; 138/30, 31; 162/232

[56] References Cited

U.S. PATENT DOCUMENTS

| | | | |
|---|---|---|---|
| 3,329,155 | 7/1967 | Partos | 137/207 |
| 3,447,557 | 6/1969 | Phelps | 137/207 |
| 3,461,914 | 8/1969 | Sugimura et al. | |
| 3,889,705 | 6/1975 | Coderre | 137/207 X |
| 3,892,329 | 7/1975 | Panacek | |
| 4,199,960 | 4/1980 | Adams et al. | |
| 4,279,269 | 7/1981 | Schink | 137/207 X |
| 4,312,382 | 1/1982 | Gebauer | |
| 4,354,362 | 10/1982 | Schumacher et al. | |
| 4,581,903 | 4/1986 | Kerry | |
| 4,627,247 | 12/1986 | Morse | |

*Primary Examiner*—Alan Cohan

*Attorney, Agent, or Firm*—Nixon & Vanderhye

[57] ABSTRACT

A hydraulic accumulator prevents oil with gas entrained in it from exiting the accumulator. The accumulator comprises a completely static structure which provides laminar flow of oil from a gas pad to the accumulator outlet. The laminar flow is preferably provided by a plurality of tubes disposed between the gas pad and the outlet, each tube having a substantially greater length than the largest cross-sectional dimension. The tubes are preferably rigid and circular in cross-section, and the passageways defined between the tubes also have a substantially greater length than the largest cross-sectional dimension. The accumulator can either be a low pressure accumulator or a high pressure accumulator. With a high pressure accumulator it is desirable to provide a float switch or like sensor to ensure that the tubes within a tube bundle are always fully immersed in oil. The accumulator is particularly useful in association with an atmospheric or pressure diffuser for treating paper pulp, which includes one or more screens which are hydraulically reciprocated.

20 Claims, 3 Drawing Sheets

10
11
12
13
15
16
21
22
24
26
28
29
30
31
33
34
35
36
37
38
40
41
42
60
61
63
64
110
111
112
113
115
211
212
213
215
260
261
$N_2$
V
L

PISTONLESS ACCUMULATOR

BACKGROUND AND SUMMARY OF THE INVENTION

In hydraulic accumulators, it is necessary to prevent too much gas (typically air for low pressure accumulators or nitrogen for high pressure accumulators) from dissolving in the hydraulic fluid (oil) since if oil leaves the accumulator with air entrained in it, it can adversely affect the operation of the hydraulic components with which the accumulator is associated. This is especially so in atmospheric and pressure diffusers in the pulp and paper field. In such diffusers there typically is a high pressure accumulator which stores power for the sudden down stroking of screen components within the diffuser, and typically also includes a low pressure accumulator to absorb the sudden surge of oil from the down stroke so that it does not splash or slosh when it enters the atmospheric pressure oil reservoir. Conventionally, too much entrainment of gas in oil is accomplished by the provision of a boat or piston which floats on the top of the oil. However such boats are far from ideal, often sinking during use. When that happens it is necessary to turn off the accumulator, take it apart, and re-float the boat.

According to the present invention, a simple static, yet effective, structure is provided which prevents oil with dissolved gas from being discharged from the accumulator, and accomplishes this result in a relatively inexpensive manner. The apparatus according to the present invention may be utilized both for high pressure accumulators and for low pressure accumulators, and is less expensive and much more reliable than accumulators typically used commercially in atmospheric and pressure diffusers in the pulp and paper industry.

The most basic aspect of the present invention is to provide substantially laminar flow of the oil within the accumulator casing from between its contact with the gas and the outlet from the accumulator. In this way, in low pressure accumulators the liquid velocity is evened out across the cross-section of the accumulator so that there is no possibility of a central jet splashing against the roof of the accumulator entraining air, or otherwise entraining substantial quantities of gas therein. In the case of a high pressure accumulator, it is necessary for the gas to diffuse into the oil rather than being entrained by convection. Since diffusion is such a slow process and in view of the relatively long length of the laminar flow path, it is essentially impossible for oil with gas diffused therein to reach the outlet of the accumulator.

According to one aspect of the present invention a hydraulic accumulator is provided which comprises the casing, means providing at least one opening in the casing for the passage of oil into the casing and out of the casing, means for providing a gas pad acting on the oil within the casing, and means for providing laminar flow of oil from contact with the gas to the opening for passage of oil out of the casing so as to prevent entrainment of gas in oil that passes out of the casing. The laminar flow providing means may comprise a honeycomb, a plurality of solid bars with passageways between them, or a wide variety of other structures, but preferably comprises a plurality of tubes. Each tube has a substantially greater length than the largest cross-sectional dimension thereof, and the tubes are packed so that passageways defined therebetween also have a substantially greater length than the largest cross-sectional dimension thereof. Means are provided, such as a mounting flange welded to the outer tubes with inner tubes welded to the outer tubes, between the casing opening and the gas pad so that any oil passing from the gas pad to the opening and vice-versa must pass through the tubes or the passageways between them. The tubes typically are rigid and circular in cross-section.

It is most desirable that the casing be vertically oriented. The means providing at least one opening preferably comprises an inlet tube at the bottom of the casing, a baffle surrounding the inlet tube to prevent oil entering the casing from moving in a straight path upon initial entry into the casing, a perforated plate surrounding the inlet tube at the opening and leading from the casing to an outlet chamber, and an outlet tube leading from the outlet chamber to a component exterior of the casing.

Where the accumulator serves as a low pressure accumulator, with atmospheric air provided as the gas pad, the tubes provide a means for evening out the liquid velocity across a cross-section of the casing so that there is no central jet of oil that will splash against the roof. Where the accumulator is a high pressure accumulator, having a pressurized gas pad (typically nitrogen), the tubes provide means for ensuring that oil saturated with gas from contact with the gas pad does not mix with oil that actually leaves the accumulator through the opening.

The invention also relates to a diffuser for treating paper pulp including screen means and hydraulic means for reciprocating the screen means up and down. The hydraulic means comprises a high pressure accumulator which stores power for the sudden down stroking of the screen means, an atmospheric pressure oil reservoir, and a low pressure accumulator for absorbing the sudden surge of oil from the down stroke so that it does not splash when it enters the atmospheric pressure oil reservoir. At least one of the accumulators comprises a casing, means defining at least one opening adjacent one end of the casing for oil to enter and leave the casing, a gas pad, and a plurality of rigid tubes packing the casing between the gas pad and the opening, each of the tubes having a significantly greater length than the largest cross-sectional dimension thereof.

It is the primary object of the present invention to provide a simple, inexpensive, and effective hydraulic accumulator, particularly for use in association with a diffuser. This and other objects of the invention will become clear from an inspection of the detailed description of the invention, and from the appended claims.

DETAILED DESCRIPTION OF THE DRAWINGS

Figure 5:
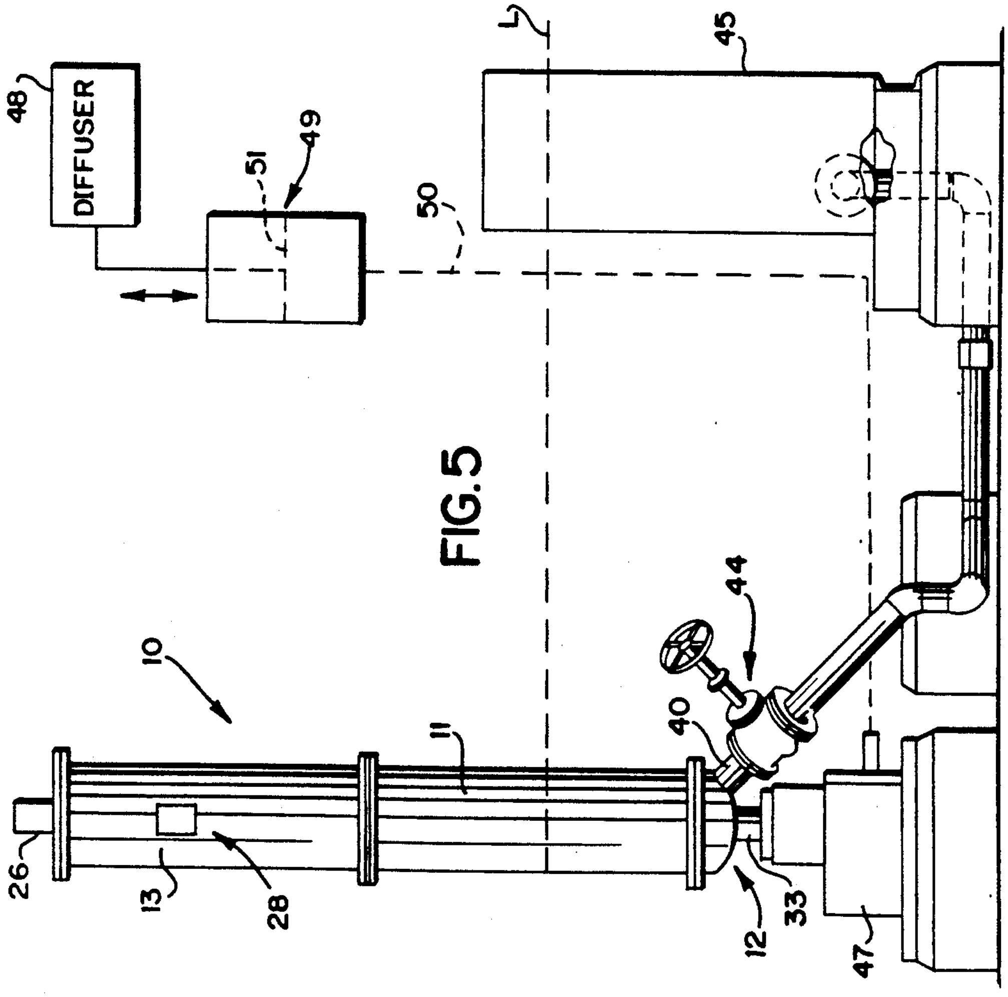
FIG. 5 is a schematic view of the hydraulic accumulator according to the invention in association with other hydraulic components associated with a diffuser.
Figures 3, 4, 6, 7:
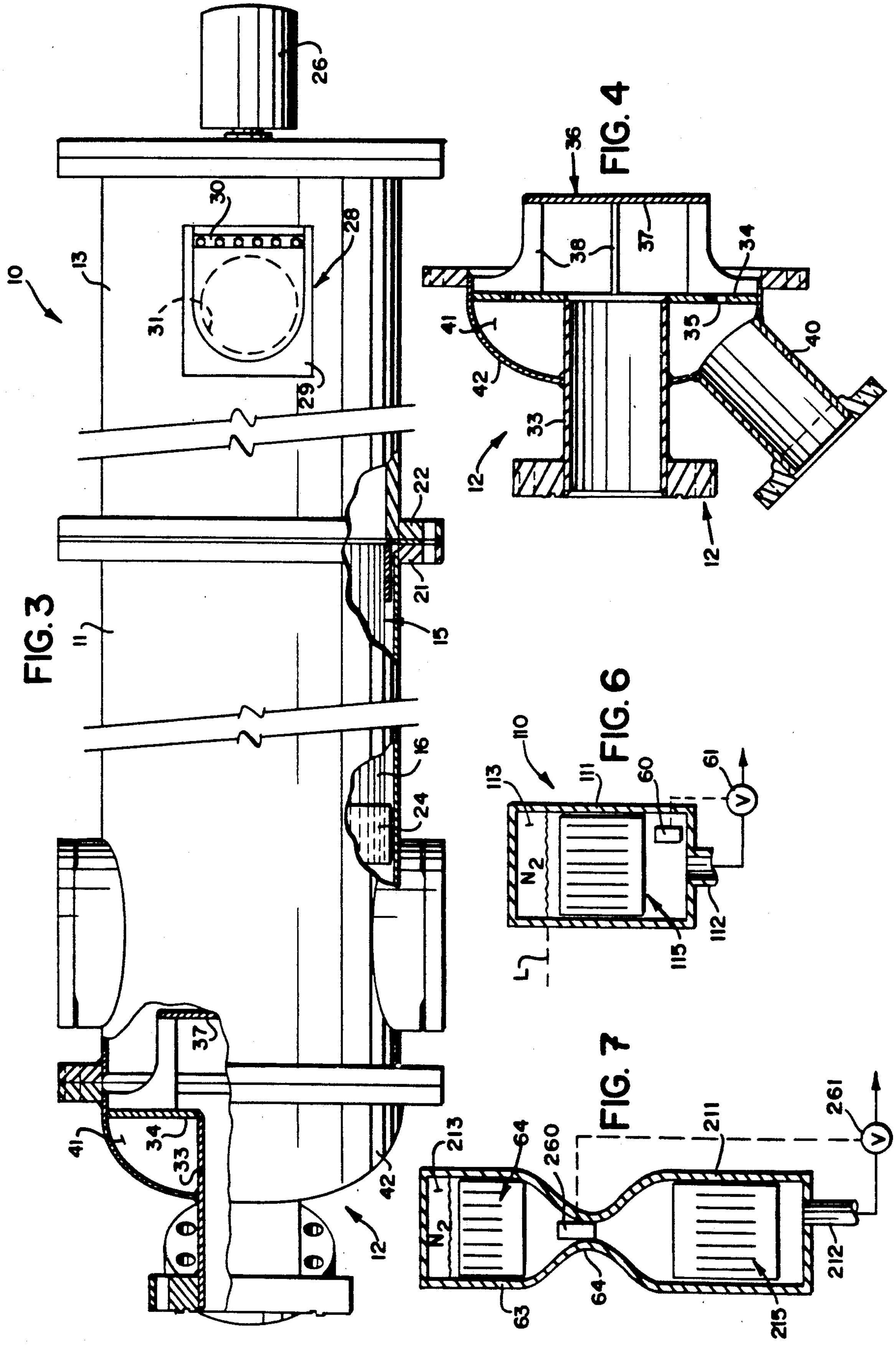
FIG. 3 is a side view, partly in cross-section and partly in elevation, of an exemplary accumulator according to the invention.
FIG. 4 is a cross-sectional detail view of the inlet/-outlet to the hydraulic accumulator of FIG. 3.
FIG. 6 is a side cross-sectional schematic view of an exemplary high pressure accumulator according to the present invention.

A hydraulic accumulator according to the present invention is illustrated generally by reference numeral 10 in FIGS. 3 and 5. The accumulator comprises a casing 11, and means—shown generally by reference numeral 12—providing at least one opening in the casing for the passage of oil into the casing and out of the casing at one end thereof. There also is means for providing a gas pad for acting on the oil within the casing, the gas pad being the upper portion 13 of the accumulator above the level of oil within the accumulator. The gas typically is atmospheric air in a low pressure accumulator, and nitrogen under pressure in a high pressure accumulator. An important component according to the present invention, which prevents oil with air entrained therein from actually exiting the casing 11 through the means 12, comprises means for providing laminar flow of oil from contact with the gas of the gas pad to the opening means 12.

Figure 1:
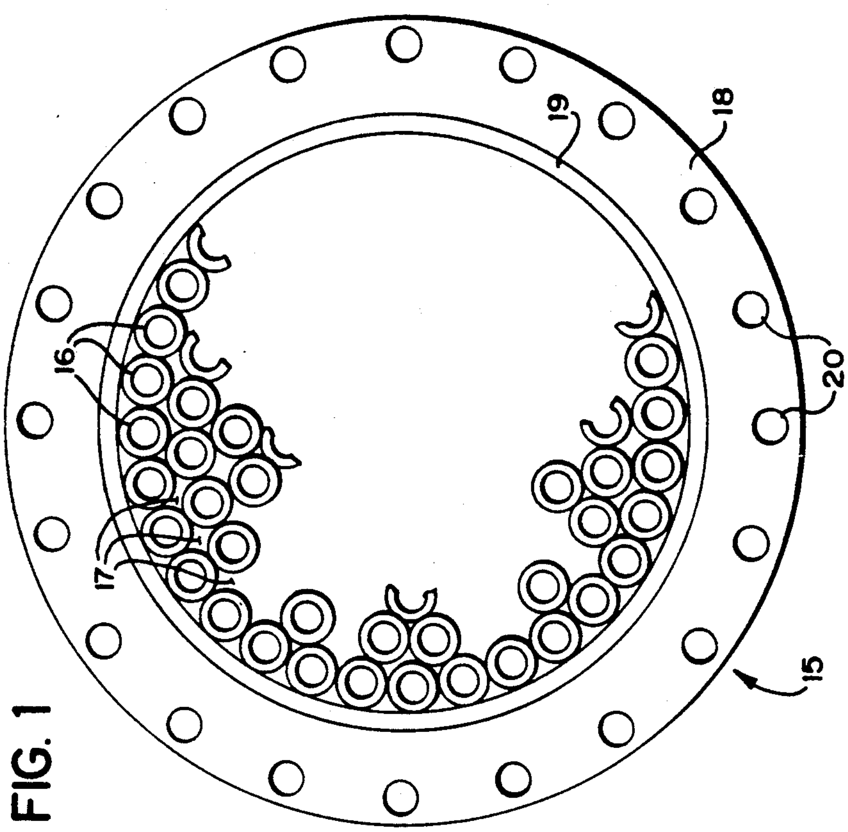
FIG. 1 is an end view of a bundle of tubes utilized in a hydraulic accumulator according to the invention.
Figure 2:
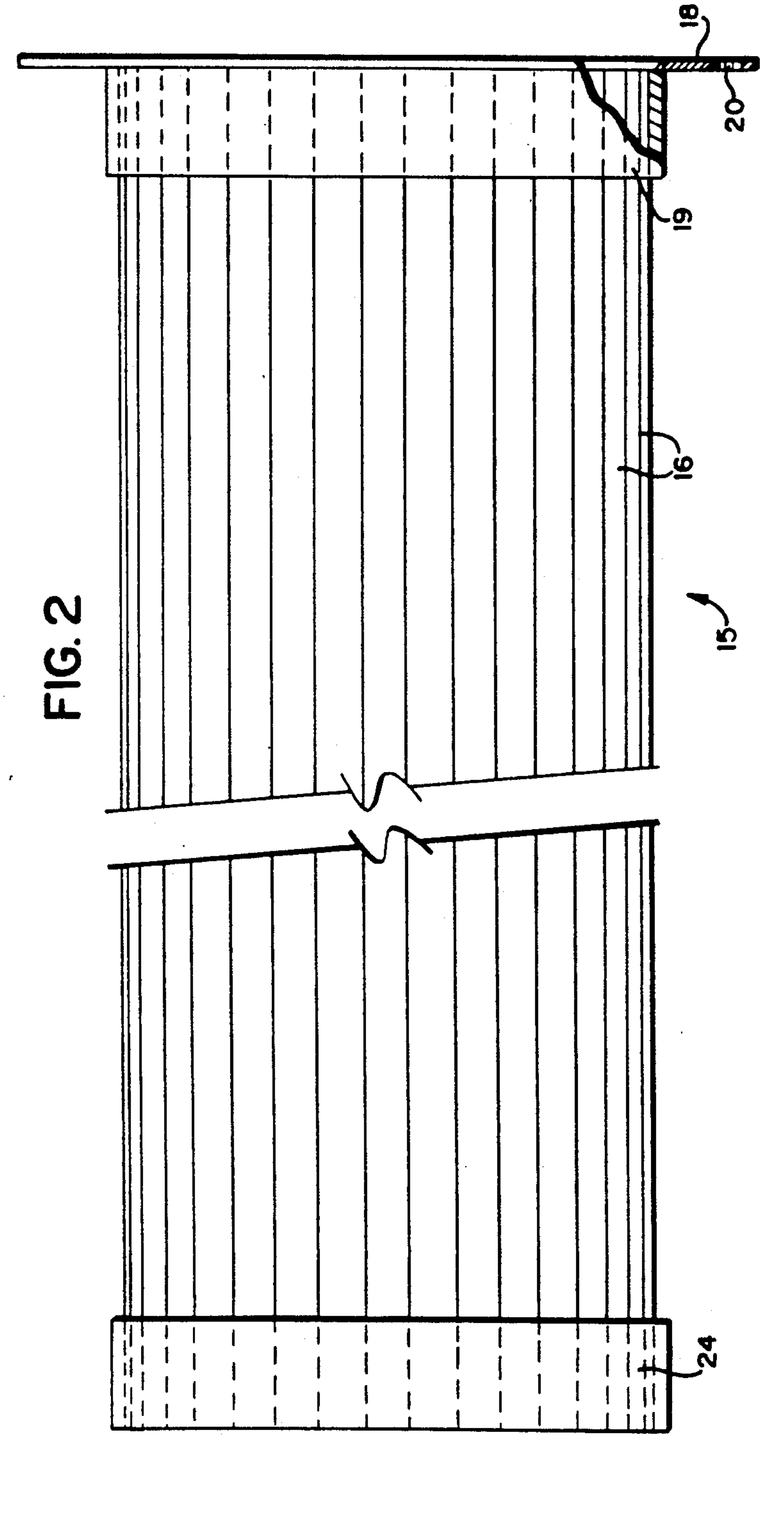
FIG. 2 is a side view of the bundle of FIG. 1.

The laminar flow providing means may comprise a honeycomb structure, a plurality of parallel bars with linear passages between them, or the like, but preferably comprises the tube bundle shown generally by reference numeral 15 (FIGS. 1 through 3). The tube bundle comprises a plurality of tubes 16, each having a substantially greater length than the largest cross-sectional dimension thereof. Desirably the tubes are circular in cross-section, and have rigid walls, e.g. are made of metal. One non-limiting example of dimensions of tubes 16 that could be utilized would be metal tubes having a 1¼ inch outside diameter, a 1.084 inch inside diameter, and a 38 inch length. The length of the tubes 16 must be greater than the length of the maximum amount of oil movement within the accumulator 10, and the tube diameter should be small enough to ensure laminar flow at the flow velocities that will be encountered within the accumulator. The tubes 16 have little pressure drop across them, which is desirable. If the pressure drop is too high, then the accumulator will not properly function in the primary way that an accumulator should function—that is to eliminate surges.

The tube bundle 15 is mounted by mounting means between the casing opening structure 12 and the gas pad so that any oil passing from the gas pad to the opening and vice-versa must pass through the tubes 16, or the passageways 17 between the tubes. Note that the passageways 17 also have a substantially greater length than the largest cross-sectional dimension thereof so that laminar flow is provided within them.

The mounting means—for the exemplary embodiment illustrated in the drawings—includes the flange 18 with depending collar 19 (see FIGS. 2 and 3 in particular) with a plurality of holes or openings 20 provided around the flange 18. The flange 18 is sandwiched between a pair of cooperating flanges 21, 22 associated with the casing (connecting the bottom part of the casing 11 to the top part 13), with openings in the flanges 21, 22 aligned with the holes or openings 20 to receive fasteners (such as bolts, not shown) therein. The tubes 16 are rigidly affixed to the flange 18 and/or collar 19. One particularly desirable way for accomplishing this is to weld the tubes 16 that are in contact with the collar 19 to the collar, and then weld all of the interior tubes along a small portion of the length thereof to the tubes in contact with the collar 19. Alternatively, some sort of a friction fit arrangement can be provided, clamping, a mounting screen, or a banding arrangement. For example, the flange 18 and collar 19 can be heated so that they expand, slipped around the ends of a packing of tubes 16, and then when the flange 18 and collar 19 cool they will tightly hold the tubes 16.

It is desirable, although not necessary, to also provide a collar 24, generally comparable to the collar 19, at the bottom end of the tube bundle 15, and to weld the tubes 16 to the collar 24, and to each other at the area of the collar 24, as described above with respect to the collar 19.

The actual accumulator 10 illustrated in FIGS. 1 through 5 is a low pressure accumulator. It is highly desirable that the casing 11 be vertically oriented. Air provides gas for the gas pad, and may enter the upper portion 13 of the casing 11 through a breather cap/filter 26. As oil flows out of the casing 11, air will be drawn in through the filter 26 to provide a head of gas. When the oil level rises within the casing 11, it is desirable to have the air exhaust quickly, and for that purpose a flap valve 28 is provided. The flap valve comprises a flap 29 of rubber or like material which is connected at the top end 30 thereof to the casing section 13, and hangs freely covering a large opening 31 in the side wall of the casing. Little air can enter through the flap valve 28 into the casing (rather it must go through the filter 26), but the air can freely pass out of the opening 31 past the flap 29 when oil is entering the casing 11.

The structure 12 at the bottom of the casing 11 is illustrated most clearly in FIGS. 3 and 4. That structure includes an inlet pipe 33 mounted to a plate 34 [that has a plurality of openings 35 therein e.g. is perforated] at pipe 33's entry into the casing 11, with a baffle 36 disposed above the inlet pipe 33. The baffle directs the inflowing oil radially outwardly before it can pass upwardly. This ensures that oil that is introduced—which may be introduced under significant pressure—does not short circuit or splash up through the central most tubes 16. The baffle 36 includes a top plate 37 overlying the inlet pipe 33, and supported by three or more support plates 38 disposed around the periphery of the horizontal plate 37, and welded to both the plate 37 and the perforated plate 34.

The structure 12 also includes an outlet pipe 40. The outlet pipe communicates with an outlet chamber 41, defined by the very bottom portion 42 of the casing 11. Oil exiting the casing 11 will pass through the openings 35 in the plate 34, into the outlet chamber 41, and then out through the outlet pipe 40. The oil will then pass through the orifice defining structure 44, and then to an atmospheric pressure oil reservoir 45. The normal level of the oil in reservoir 45 is illustrated by dotted line with reference character "L" directed thereto in FIG. 5. The orifice defining means 44 can be a valve which is moved to the most desirable position and then locked in place, or a non-adjustable orifice. The purpose of the orifice defining means 44 is to reduce surge and to maintain the oil level above the tubes 16. Located in communication with the inlet tube 33 is the valve 47 for switching the hydraulic cylinders or otherwise communicating with other hydraulics in the system with which the accumulator 10 is associated.

One particularly useful environment for the accumulator 10 is with an atmospheric or pressure diffuser 48 which is a standard piece of equipment in the pulp and paper industry, such as are sold by Kamyr, Inc. of Glens Falls, N.Y. and Kamyr AB of Karlstad, Sweden. A diffuser has screens therein which reciprocate, and reciprocation is effected by one or more hydraulic cylinders 49. The valve 47 is connected by a hydraulic line 50 or the like to cylinder 49 to cause the piston 51 associated therewith to reciprocate to move the screens in the diffuser up and down. The accumulator 10, illustrated in FIG. 5 is a low pressure accumulator for absorbing the sudden surge of oil from the down stroke so that it does not splash when it enters the atmospheric pressure oil reservoir 45. Typically a high pressure accumulator is also provided which stores power for the sudden down stroking of the screen means. Either or both of the accumulators associated with the diffuser 48 may be accumulators like the accumulator 10. In the low pressure accumulator, the tube bundle 15 comprises means for evening out the liquid velocity across the cross-section of the casing so that there is no central jet of oil that will splash against the roof of the casing, as happens in conventional low pressure accumulators.

The same basic construction of accumulator as illustrated by reference numeral 10 in FIGS. 1 through 5 may be utilized in a high pressure accumulator. In a high pressure accumulator, however, the breather cap/filter 26 and flap valve 28 will not be provided, nor is it necessary to provide a long upper casing section 13 in order to provide head. Instead, as illustrated schematically in FIG. 6 for the accumulator 110, a pad 113 of nitrogen gas, or the like, under pressure is provided above the level of oil within the casing 111. In the FIG. 6 embodiment structures with the same function as those in the FIGS. 1 through 5 embodiment are shown by the same reference numeral only preceded by a "1".

For a high pressure accumulator 110, having a tube bundle 115 mounted therein, it is important that the oil never be allowed to drain out of the accumulator completely otherwise disastrous consequences can occur. In fact it is highly desirable to make sure that the oil never drains below the top of the tube bundle 115. This may be accomplished, for example, by providing a level sensing mechanism 60 within the casing 111. The level sensing mechanism 60, which may be electronic, a float switch, or the like, cooperates a shut-off valve 61 to shut the valve 61 off should a low level condition be sensed, so that oil cannot pass through the opening 112 and completely drain out of the accumulator 110.

Figure 8:
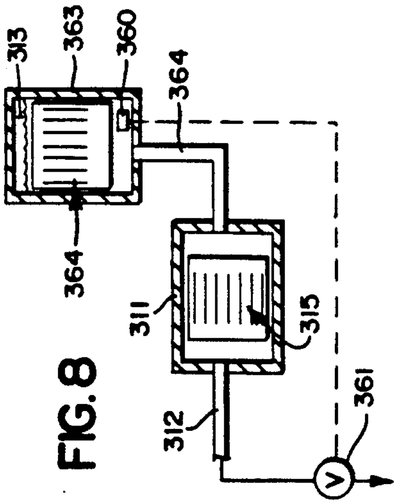
FIGS. 7 and 8 are schematic cross-sectional views of two other exemplary embodiments of high pressure hydraulic accumulators according to the invention.

FIGS. 7 and 8 illustrate other alternative embodiments of exemplary high pressure accumulators. In these embodiments comparably functioning structures are illustrated by the same two digit reference numeral as in FIGS. 1-6, only preceded by a "2".

In the FIG. 7 embodiment, to make sure that the tube bundle 215 within casing 211 is never not completely immersed in oil, a casing extension 63 is provided. In the casing extension 63, in which the gas pad 213 is provided, optionally there also may be another tube bundle 64 identical to the tube bundle 215 (or having somewhat different dimensions, e.g. being shorter). Between the casing extension 63 and the casing 211 is a necked down portion 64. The float switch or other sensing mechanism 260 is mounted within the neck down portion 64, and controls the valve 261 for shutting off the flow of oil out the opening structure 212.

The FIG. 8 embodiment is comparable to the FIG. 7 embodiment, with like structures illustrated by the same two digit reference numeral only preceded by a "3". In this embodiment the casing 311 is horizontally disposed, as of course are the passageways through and between the tubes of the tube bundle 315. The casing extension 363 is vertical, and the necked down portion therebetween actually comprises a right angle bend pipe 364. A float switch or like level sensing mechanism 360 is provided below the optional tube bundle 364 in the casing extension 363, and controls the valve 361.

In both the FIG. 7 and FIG. 8 embodiments, the level sensing mechanism 260, 360 prevents the oil level from ever falling below the tops of the tube bundles 215, 315.

In the high pressure accumulator embodiments of FIGS. 6 through 8, the tube bundles 115, 215, 315 comprise means for ensuring that oil saturated with gas from contact with the gas pad 113, 213, 313 does not mix with oil that actually leaves the accumulator through the opening 112, 212, 312.

It will thus be seen that according to the present invention an advantageous hydraulic accumulator, and a diffuser associated with the advantageous hydraulic accumulator, have been provided. The accumulator according to the present invention—in a simple yet effective manner, with essentially no moving parts—prevents oil with gas entrained therein from ever passing out of the accumulator.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A hydraulic accumulator comprising:

(a) a casing;

(b) means providing at least one opening in said casing for the passage of oil into said casing and out of said casing;

(c) means providing a gas pad for acting on the oil within said casing;

(d) means for providing laminar flow of oil from contact with the gas to said opening for passage of oil out of said casing so as to prevent entrainment of gas in oil that passes out of said opening, comprising: a plurality of tubes, each tube having a substantially greater length than the largest cross-sectional dimension thereof; and means for mounting said tubes between said casing opening and said gas pad so that any oil passing from the gas pad to the opening and vice-versa must pass through said tubes or passageways between said tubes, which passageways have a substantially greater length than the largest cross-sectional dimension thereof.

2. An accumulator as recited in claim 1 wherein said tubes have rigid walls and are circular in cross-section.

3. An accumulator as recited in claim 1 wherein said means providing at least one opening comprises: an inlet tube; a baffle at said inlet tube to prevent oil entering said casing from moving in a straight path upon initial entry into said casing; a perforated plate surrounding said inlet tube at the opening thereof to restrict surging into said casing and leading from said casing to an outlet chamber; and an outlet tube leading from said outlet chamber to components exterior of said casing.

4. An accumulator as recited in claim 1 wherein said means (c) provides a pressurized gas pad placing said oil under pressure.

5. An accumulator as recited in claim 1 wherein said casing is vertically oriented so that said at least one opening is adjacent the bottom thereof.

6. An accumulator as recited in claim 5 wherein said casing has a one way valve at the area of said gas to allow gas to be quickly expelled from said casing, and a filter for taking gas into said casing gas area during the exit of oil therefrom.

7. A low pressure hydraulic accumulator comprising:

a vertically oriented casing having side walls, a roof, and a bottom;

means providing at least one opening in the bottom of said casing for the passage of oil into said casing and out of said casing;

means providing a gas pad between the roof and the oil for acting on oil within said casing; and means for evening out the liquid velocity across the cross-section of the casing so that there is no central jet of oil that will splash against the roof, comprising a plurality of tubes each having a significantly greater length than the largest dimension of its cross-section; and means for mounting said tubes between said casing opening and said gas pad so that any oil flowing from said opening toward said gas pad must pass through the tubes, or spacings between the tubes, each of the spacings between the tubes having a significantly greater length than the largest dimension of the cross-section thereof.

8. An accumulator as recited in claim 7 wherein said tubes are circular in cross-section.

9. An accumulator as recited in claim 7 wherein said tubes have rigid walls.

10. An accumulator as recited in claim 7 wherein said casing has a one way valve at the area of said gas to allow gas to be quickly expelled from said casing, and a breather cap/filter for taking gas into said casing gas area during the exit of oil therefrom.

11. An accumulator as recited in claim 7 wherein said casing is vertically oriented so that said opening is adjacent the bottom thereof.

12. A high pressure hydraulic accumulator comprising:

a casing:

means providing at least one opening in said casing for the passage of oil into said casing and out of said casing;

means providing a pressurized gas pad for placing oil within said casing under pressure; and static means for ensuring that oil saturated with gas from contact with the gas pad does not mix with oil that actually leaves the accumulator through said opening, comprising a plurality of tubes packing the casing, each tube having a significantly greater length than the largest cross-sectional dimension thereof; and means for mounting said tubes between said opening and said gas pad so that any oil in contact with the gas must flow through the tubes, or spaces between the tubes, to reach the openings, each of said spaces between the tubes also having a significantly greater length than the largest cross-sectional dimension thereof.

13. An accumulator as recited in claim 12 wherein said tubes are circular in cross-section.

14. An accumulator as recited in claim 12 wherein said tubes have rigid walls.

15. An accumulator as recited in claim 12 wherein the casing is vertically oriented, and further comprising means for sensing the level of oil in said accumulator, and for cutting off the flow of oil out of said casing if the level falls below the top of said tubes.

16. A hydraulic accumulator comprising:

(a) a casing;

(b) means providing at least one opening in said casing for the passage of oil into said casing and out of said casing;

(c) means providing a gas pad for acting on oil within said casing;

(d) means for defining a plurality of substantially linear passageways, each passageway having a substantially greater length than the largest cross-sectional dimension thereof; and (e) means for mounting said means (d) between said casing opening and said gas pad so that any oil passing from the gas pad to the opening and vice-versa must pass through said passageways.

17. A diffuser for treating paper pulp, including screen means, and hydraulic means for reciprocating said screen means up and down, said hydraulic means comprising:

a piston and cylinder, which piston strokes up and down, the piston connected to said screen means;

a high pressure accumulator which stores power for the sudden down stroking of said screen means;

an atmospheric pressure oil reservoir; and a low pressure accumulator for absorbing the sudden surge of oil from the down stroke so that it does not splash when it enters the atmospheric pressure oil reservoir; and wherein at least one of said accumulators comprises: a casing; means defining at least one opening adjacent one end of said casing for oil to enter and leave said casing; a gas pad; and a plurality of rigid tubes packing the casing between said gas pad and said opening, each of said tubes having a significantly greater length than the largest cross-sectional dimension thereof.

18. A hydraulic accumulator comprising:

(a) a casing;

(b) means providing at least one opening in said casing for the passage of oil into said casing and out of said casing;

(c) means providing a gas pad for acting on the oil within said casing;

(d) means for providing laminar flow of oil from contact with the gas to said opening for passage of oil out of said casing so as to prevent entrainment of gas in oil that passes out of said opening; and said means providing at least one opening comprising: an inlet tube, a baffle surrounding said inlet tube to prevent oil entering said casing from moving in a straight path upon initial entry into said casing; a perforated plated surrounding said inlet tube at the opening thereof into said casing and leading from said casing to an outlet chamber; and an outlet tube leading from said outlet chamber to components exterior of said casing.

19. An accumulator as recited in claim 7 wherein said tubes are circular in cross section and have rigid walls.

20. An accumulator as recited in claim 18 wherein said casing is vertically oriented so that said at least one opening is adjacent the bottom thereof.

* * * * *